Nov. 29, 1966 G. W. HALLQUIST ET AL 3,289,086

AUTOMATIC FREQUENCY CONTROL FOR PHASE PULSE RECEIVERS

Filed Jan. 24, 1963

INVENTORS
GEORGE W. HALLQUIST
D. PETER KANE

BY

H. H. Losche

ATT'YS.

United States Patent Office 3,289,086

Patented Nov. 29, 1966

3,289,086

AUTOMATIC FREQUENCY CONTROL FOR PHASE PULSE RECEIVERS

George W. Hallquist, Orange, and David Peter Kane, Sunnyvale, Calif., assignors, by mesne assignments, to the United States of America as represented by the Secretary of the Navy Filed Jan. 24, 1963, Ser. No. 253,775
8 Claims. (Cl. 325—320)

This invention relates to automatic frequency control circuits and more particularly to an automatic frequency control circuit for controlling the frequency of discretely phase shifted signals of a data transmission phase pulse receiver device for communicating intelligence by phase shifted signals.

One form of transmitting intelligence by radio radiation is by discretely shifting the phase of a fixed frequency carrier signal at precise time intervals to provide phase shifted signals or "data tones" as they are sometimes referred to in a system called "Kineplex" of the Collins Radio Company. A fixed frequency signal, that is regularly phase shifted by some discrete angle, contains a wide spectrum of sidebands. If any of those sidebands lie within the bandwidths of a discriminator employed in a conventional automatic frequency control (AFC) system, the system can lock-on to a sideband instead of the carrier. The frequencies involved are sometimes located so close to the carrier that it is impractical to eliminate them by conventional filtering.

In the present invention the carrier is reproduced by a variable frequency oscillator. The nominal frequency of this variable frequency oscillator is $nf$, where $f$ is the desired frequency and $n$ is the sum of stable states that can be assumed by the phase of the incoming signal. For example, if the incoming frequency signal is discretely phase shifted by integral multiples of 45°, the frequency signal phase can be the sum of any of eight stable states and hence, in this example, $n$ would be equal to 8. The discretely phase shifted signal is compared with the output of the variable frequency oscillator in a phase comparison circuit and the output of this phase comparison circuit is used to control or vary the frequency of the variable frequency oscillator. In this circuit a certain phase angle of the incoming signal is compared for coincidence with a certain phase angle of the variable frequency oscillator output. The output of this phase comparison is a control voltage that controls the variable frequency oscillator output. This coincidence comparison between the two unequal frequencies can be made only when two conditions are met, such as (1) when the frequencies are harmonically related, and (2) when the frequency ratio is related to $n$, the number of stable states of phase. The output of the variable frequency oscillator is used in demodulating the phase shifted frequency signals to correct each phase shifted frequency signal to conduct predominately a single frequency without sidebands to a discriminator or other detection means of the AFC system. It is therefore a general object of this invention to provide an AFC circuit for an AFC control system to establish a wide range of discretely phase shifted frequency data transmitted signals displaced on both sides of the center frequency without sidebands to provide stable frequency control for the receiver system.

These and other objects and the attendant advantages, features, and uses of this invention will become more apparent to those skilled in the art as the description proceeds when considered along with the accompanying drawing, in which.

Figures 1, 2:
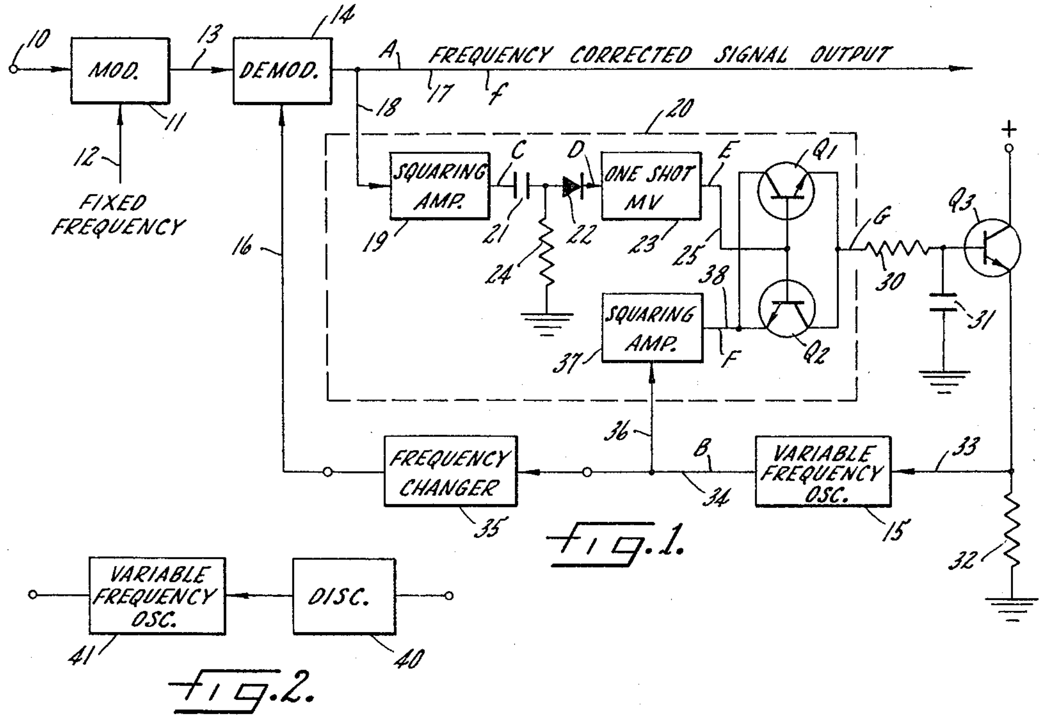
FIGURE 1 illustrates, partially in block and partially in circuit schematic, an AFC circuit for establishing a predominant frequency with a minimum of sidebands in a discretely phase shifted signal data transmission receiver system.
FIGURE 2 illustrates in block diagram a component which may be substituted for a component in FIGURE 1 to illustrate a second embodiment in FIGURE 1.
Figure 3:
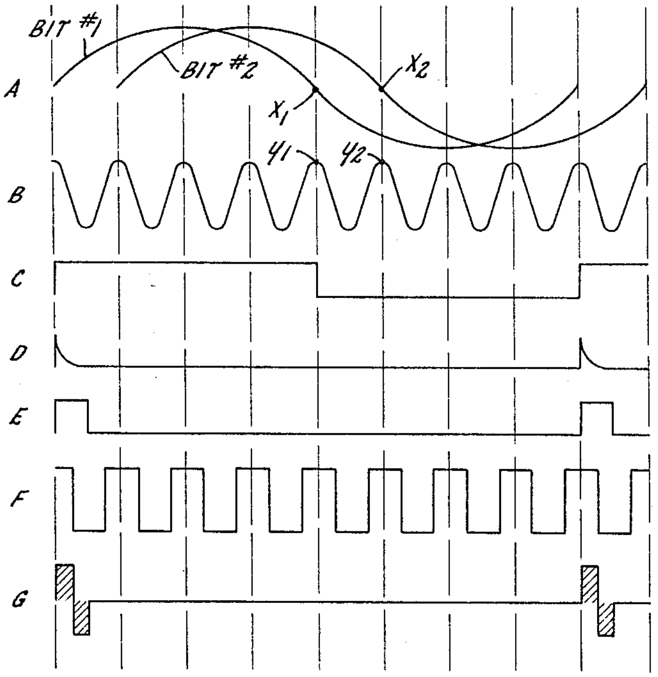
FIGURE 3 illustrates a series of frequency and voltage waveforms of signals at various points in FIGURE 1.

Referring more particularly to FIGURE 1, with occasional reference to the waveforms as applicable in FIGURE 3, there is shown an input terminal 10 to a modulator 11 which is modulated by a fixed frequency over the conductor means 12. The output of modulator 11 is by way of conductor means 13 to a demodulator circuit 14 to which frequency oscillations from a variable frequency oscillator 15 are also applied by way of the conductor means 16. The input terminal 10 is coupled in a receiver circuit to receive discretely phase shifted data transmission frequency signals in the form of sine waves which, after being passed through the modulator and demodulator means 14, are produced on the demodulator output 17 as sine waves in the form shown by A in FIGURE 3.

The discretely phase shifted sine wave data transmission signals on the conductor 17 are applied by way of conductor means 18 to a squaring amplifier 19 of an AFC circuit shown within dash lined box 20. The squaring amplifier 19 will produce a square amplified wave of whatever sine wave bit is being transmitted at that time over the conductor means 17. For the purpose of example, let it be assumed that bit #1 as shown in FIGURE 3A is for the moment being conducted over the conductor means 17 and this bit squared and amplified in the squaring amplifier 19 to produce the waveform C as shown in FIGURE 3. The output of this squaring amplifier 19 is coupled through a capacitor 21 and a diode 22 to a one-shot multivibrator 23. The common terminal of capacitor 21 and diode 22 is coupled through a resistor 24 to a fixed potential, such as ground, to provide a differentiating circuit consisting of capacitor 21 and resistor 24. This differentiating circuit will differentiate the frequency waveform C to produce wave D in FIGURE 3 at the output of the diode 22. The orientation of the diode 22 is such that only the positive going voltage swings of waveform C are differentiated and, accordingly, differentiation takes place at intervals of each complete cycle of the frequency signal bit #1. The differentiated wave D triggers the one-shot multivibrator 23 to produce the waveform E on its output, this output being conducted by way of conductor means 25 to the common base coupling of a pair of transistors $Q_1$ and $Q_2$ constituting a phase comparison network. Transistor $Q_1$ has its collector coupled in common with the emitter of transistor $Q_2$ and the emitter of transistor $Q_1$ is also coupled in common with the collector of transistor $Q_2$. The last-mentioned emitter-collector common coupling is connected through a resistor 30 to the base of an emitter follower transistor $Q_3$. The base of emitter follower transistor $Q_3$ is also coupled through a capacitor 31 to ground providing an integrating circuit consisting of the resistor 30 and the capacitor 31. The emitter follower transistor $Q_3$ has its collector coupled to a voltage source and its emitter coupled through an emitter load resistor 32 to a fixed potential, such as ground. The output of the emitter follower transistor $Q_3$ is coupled to the variable frequency oscillator 15 to control or vary the generated oscillations on an output 34 thereof. The frequency signal output generated by the variable frequency oscillator 15 on the output 34 is illustrated in FIGURE 3 by the waveform B.

Given as an example herein, the phase shifted data transmission frequency signals, illustrated at FIGURE 3A by bits #1 and #2, are discretely phase shifted in multiples of 45° making it necessary that the variable frequency oscillator should then produce generated oscillations of 8 times this frequency, shown as an example in FIGURE 3B. By this means a certain point in the discretely phase shifted signal, such as $X_1$, may be readily compared with the point $Y_1$ in the frequency B. In like manner a data signal produced by discretely phase shifting the carrier frequency bit #2 by 45°, the same point $X_2$ may be compared with a point $Y_2$ of the variable frequency oscillator output waveform B. This generated variable frequency B is conducted by way of the conductor means 34 to a frequency changing means 35 and thence over the conductor means 16 to the demodulator 14 for correcting the sine wave discretely phase shifted data signals over the output 17. It is to be understood that it is quite possible to generate frequency from the variable frequency oscillator in some instances for direct application to the demodulator 14, but in the general construction and use of the AFC circuit it is quite probable that a change in the frequency B may be necessary for proper demodulation in the demodulator 14. The frequency changer 35 may be made up of any suitable combination of frequency doublers, frequency dividers, or heterodyning units to produce the appropriate frequency input to the demodulator 14.

The generated frequency B is also conducted by way of the conductor means 36 through a squaring amplifier 37 to produce the squared waveform F of FIGURE 3 on the squaring amplifier output 38. The output 35 of the squaring amplifier 37 is applied to the common collector and emitter coupling of the transistor comparator network consisting of transistors $Q_1$ and $Q_2$. The application of the pulses in the waveform E over the output 25 of the one-shot multivibrator 23 to the common base coupling of transistors $Q_1$ and $Q_2$ turn these transistors "on" during each pulse period at which time a portion of the squared wave F is passed to the integrating circuit 30, 31. The portion of the waveform F which is passed is shown by the waveform G in FIGURE 3. Integration of this waveform G produces a direct current voltage, positive or negative, depending on the comparison of the areas above or below zero voltage in waveform G. By this means the carrier frequency content of the incoming signal at 10 is time integrated by the waveform G and for this reason the system can operate reasonably well both in the presence of noise and in the intermittent absence of signal. The control of the variable frequency oscillator 15 to always bring the points $X_1Y_1$, $X_2Y_2$, or any other points of discretely phase shifted 45° signals into coincidence is accomplished by varying the frequency of the variable frequency oscillator to maintain equal areas of the positive and negative portions of waveform G. The ouput of this variable frequency oscillator is used to demodulate the discretely phase shifted information bits to correct these bits for the elimination of sideband frequencies whereby a discriminator or other detection elements connected to the output conductor 17 will act on the frequency bit to the exclusion of the sidebands, if any.

As hereinabove stated, the frequency changer 35 could be a combination of frequency doublers, frequency dividers, or heterodyning devices, but also many consist of a discriminator 40 and a second variable frequency oscillator 41 as more particularly shown in FIGURE 2 to change the frequency of the variable frequency oscillator to an appropriate frequency for demodulation in the demodulator 14. The discriminator 40 may be of any suitable type to produce phase discrimination, more fully and completely described in the text Electronic and Radio Engineering, fourth edition, by Frederick E. Terman, 1955, pages 606 and 607. Variable frequency oscillator 41 may be any one of the generally well-known types to produce oscillation in accordance with a direct current control voltage on the grid circuit thereof.

OPERATION

In the operation of the device shown in FIGURE 1 let it be assumed for the purpose of example that a discretely phase shifted receiver system is designed to receive phase shifted bits of data information in discrete phase shifts of 45°. While many phase shifts are used to produce a plurality of bits of data information, only bit #1 and bit #2 are shown as an example herein in FIGURE 3. Bit #1 or bit #2 and all other bits of data information are of the same frequency herein referred to as the frequency *f*. The bits #1 and #2 and all other bits of data information are discretely phase shifted according to data input at synchronously timed intervals determined by the data element period. The resulting frequency distribution of bit information is a wide range of frequencies displaced by $N1/t$ cycles on both sides of the center frequency. N1 is any and all integers probably significant up to 10 and $t$ is the data element period. In accordance with the example of discretely phase shifting 45°, the variable frequency oscillator must produce oscillations substantially at 8 times this frequency or $8f$. For the information bit being conducted over the conductor means 17, comparison is made in the comparator network consisting of transistors $Q_1$ and $Q_2$ for points $X_1Y_1$, $X_2Y_2$, or any other of the 8 points on either side of the center frequency to produce comparison as shown by the waveform G on the output of the comparison network $Q_1Q_2$. If the area of the positive portion of the waveform G is greater than the area of the negative portion, the integrator 30, 31 will produce a positive direct current voltage through the emitter follower $Q_3$ to cause the variable frequency oscillator to change oscillations to bring $X_1Y_1$ or $X_2Y_2$ into coincidence thereby returning the waveform G to the condition of making the positive and negative voltage areas equal. This corrective factor on the variable frequency oscillator causes the generation of frequency corrected oscillations that are applied through the frequency change 35, or the discriminator 40 and the second variable frequency oscillator 41, to the demodulator 14 to produce the proper sum or difference to the phase shifted data signal bits thereby correcting these data bits to a precise signal frequency bit without sidebands for the output circuit 17. These sidebands are eliminated by virtue of the frequency comparison or coincidence taking place one cycle apart as shown by the differentiated wave D of FIGURE 3 by which comparison is made in the pulse interval of waveform E of FIGURE 3. Any discriminator coupled to the output 17, or other circuitry relying on a specific frequency or discretely phase shifted signal bits, is able to discriminate these frequency bits without danger of locking on to a close, strong sideband. It is also to be understood that this same example system would be operative if the data characteristics were changed to cause phase shifts to occur in multiples of 90°.

While many modifications and changes may be made in the constructional details or circuit features of the preferred embodiments shown and described herein, it is to be understood that we desire to be limited only by the scope of the appended claims.

We claim:

1. An automatic frequency control circuit for phase pulse receivers comprising:
   - a demodulator having two inputs, one input receiving discretely phase shifted signals and a second input receiving modulating signals maintaining the discretely phase shifted signals correct for phase discrimination on an output thereof;
   - a variable frequency oscillator generating frequency signals in multiples of said discretely phase shifted signals on an output thereof in accordance with a control signal on an input thereof;
   - a phase comparison circuit having one input coupled to the output of said demodulator and a second input coupled to the output of said variable frequency oscillator, each of said inputs having a squaring amplifier therein producing square waves, respectively, of said discretely phase shifted signals and said generated signals of said variable frequency oscillator, the output of the squaring amplifier squaring said discretely phase shifted signals being coupled through a differentiating network and a one-shot multivibrator to one input of a phase comparator network, and the output of the other squaring amplifier being coupled to another input of said phase comparator network comparing the phase relation of said signals producing on an output of said phase comparison circuit a control signal, said output being coupled to said variable frequency oscillator input; and a frequency changer circuit having an input coupling the output of said variable frequency oscillator and an output coupling the demodulator second input modulating said discretely phase shifted signals correcting same for phase discrimination out of said demodulator without phase discrimination of sidebands.

2. An automatic frequency control circuit as set forth in claim 1 wherein said phase comparator network includes a pair of transistors having the bases thereof coupled in common, the emitter of one and the collector of the other coupled in common, and the collector of said one and the emitter of said other coupled in common, the output of said one-shot multivibrator being coupled to said common base coupling, the squaring amplifier output of said variable frequency oscillator being coupled to the first-mentioned emitter-collector coupling, and the output to said variable frequency oscillator being coupled to said second-mentioned collector-emitter coupling.

3. An automatic frequency control circuit as set forth in claim 2 wherein said frequency changer includes a discriminator and a second variable frequency oscillator, each having an input and an output with the input of said discriminator coupled to the output of said variable frequency oscillator and the output of said discriminator coupled to said demodulator, the output of said discriminator and the input of said second variable frequency oscillator being coupled together.

4. An automatic frequency control circuit for phase pulse receivers comprising:

a demodulator having one input receiving discretely phase shifted frequency signals and having a second input receiving modulating frequency signals maintaining said discretely phase shifted signals correct for phase discrimination without discrimination of sidebands on an output thereof;

a variable frequency oscillator generating frequency signals harmonically related to said discretely phase shifted signals on an output thereof, said frequency being varied in accordance with a control voltage on an input thereof;

a phase comparison circuit having one input with a first squaring amplifier, a differentiating network, and a one-shot multivibrator, in that series order, coupled to said demodulator output and a second input with a second squaring amplifier therein coupled to said variable frequency oscillator output, the outputs of said one-shot multivibrator and said second squaring amplifier being coupled to a phase comparison transistor network conducting the squared variable frequency oscillations in one state of said one-shot multivibrator through said differentiating network and the squared voltage signals of said second squaring amplifier to said transistor network producing a control voltage on an output of said phase comparison network constituting an output of said phase comparison circuit in accordance with the phase relation of said demodulator and variable frequency oscillator outputs, said phase comparison circuit output being coupled to said variable frequency oscillator input;

an integrating network coupled to said comparison circuit output to said variable frequency oscillator to integrate said control voltage producing substantially a direct current voltage; and means coupling the output of said variable frequency oscillator to said demodulator second input whereby said demodulator output constitutes discretely phase shifted frequency signals corrected in all discretely phased states by comparison at frequency intervals with a controlled frequency to minimize sideband effects.

5. An automatic frequency control circuit as set forth in claim 4 wherein said coupling of said differentiating network to said one-shot multivibrator includes a diode whereby differentiated signals of only one polarity change are conducted to said one-shot multivibrator and wherein said phase comparison transistor network includes a pair of transistors having the bases thereof coupled in common, the collector of one connected to the emitter of the other, and the emitter of said one connected to the collector of said other, said one-shot multivibrator being coupled to said common base connection, said squaring amplifier of said variable frequency oscillator coupled to the first-mentioned collector-to-emitter connection, and said output taken from the second-mentioned emitter-to-collector connection.

6. An automatic frequency control circuit as set forth in claim 5 wherein said coupling of said integrator and said variable frequency oscillator includes an emitter follower.

7. An automatic frequency control circuit as set forth in claim 6 wherein said means coupling the output of said variable frequency oscillator to said demodulator second input includes a frequency changer adapting the frequency of said variable frequency oscillator for said demodulator.

8. An automatic frequency control circuit as set forth in claim 7 wherein said frequency changer comprises a discriminator and a second variable frequency oscillator.

References Cited by the Examiner

UNITED STATES PATENTS

| | | | |
|---|---|---|---|
| 3,032,650 | 5/1962 | Mathison | 325—419 X |
| 3,109,143 | 10/1963 | Gluth | 325—320 |
| 3,181,122 | 4/1965 | Brown | 325—30 X |

DAVID G. REDINBAUGH, *Primary Examiner.*

S. J. GLASSMAN, *Assistant Examiner.*